United States Patent [19]

Colombo et al.

[11] 4,335,279

[45] Jun. 15, 1982

[54] MECHANICAL TELEPHONE CONVERSATION TIME LIMITING DEVICE

[76] Inventors: Donato Colombo, Via S. Ammirato, 61; Lapo Baldacci, Via Lungo l'Affrico, 212, both of Florence, Italy

[21] Appl. No.: 141,745

[22] Filed: Apr. 18, 1980

[30] Foreign Application Priority Data

Apr. 24, 1979 [IT] Italy .............................. 22110 A/79

[51] Int. Cl.³ ............................................ H04M 1/00
[52] U.S. Cl. ............................ 179/7.1 R; 179/158 R; 368/4
[58] Field of Search ............ 179/2 TC, 7.1 R, 7.1 TP, 179/7 R, 158 R, 1 HS; 368/4, 13

[56] References Cited

U.S. PATENT DOCUMENTS

| | | | |
|---|---|---|---|
| 2,202,149 | 5/1940 | Gottlieb | 179/159 R |
| 2,609,045 | 9/1952 | Kaiser | 368/4 |
| 2,653,195 | 9/1953 | Zimmerman | 179/1 HS |
| 3,472,966 | 10/1969 | Simmons | 179/2 TC |
| 3,970,789 | 7/1976 | Simmons, Sr. | 179/2 TC |

*Primary Examiner*—Gerald L. Brigance
*Attorney, Agent, or Firm*—Guido Modiano; Albert Josif

[57] ABSTRACT

To prevent unauthorized or prolonged telephone conversations, a limiting device is attachable to an ordinary telephone set by means of a padlock means with removable key. The device comprises a timer which can be set only when one of the shut-off pushbuttons of the telephone set is depressed. A knob is provided for setting the timer which is enabled to rotate a rotatable member of the timer only after the knob has been depressed. The knob is arranged such that this depression also involves the depression of one of the pushbuttons. The timer is also operative to depress either pushbutton as the preset conversation time expires. With such a device, it is not possible to reset the timer or retard the movement of the timer in order to prolong the conversation time, because such an attempt would unavoidably result in one of the pushbuttons being depressed on the telephone set and the communication being therefore interrupted.

7 Claims, 4 Drawing Figures

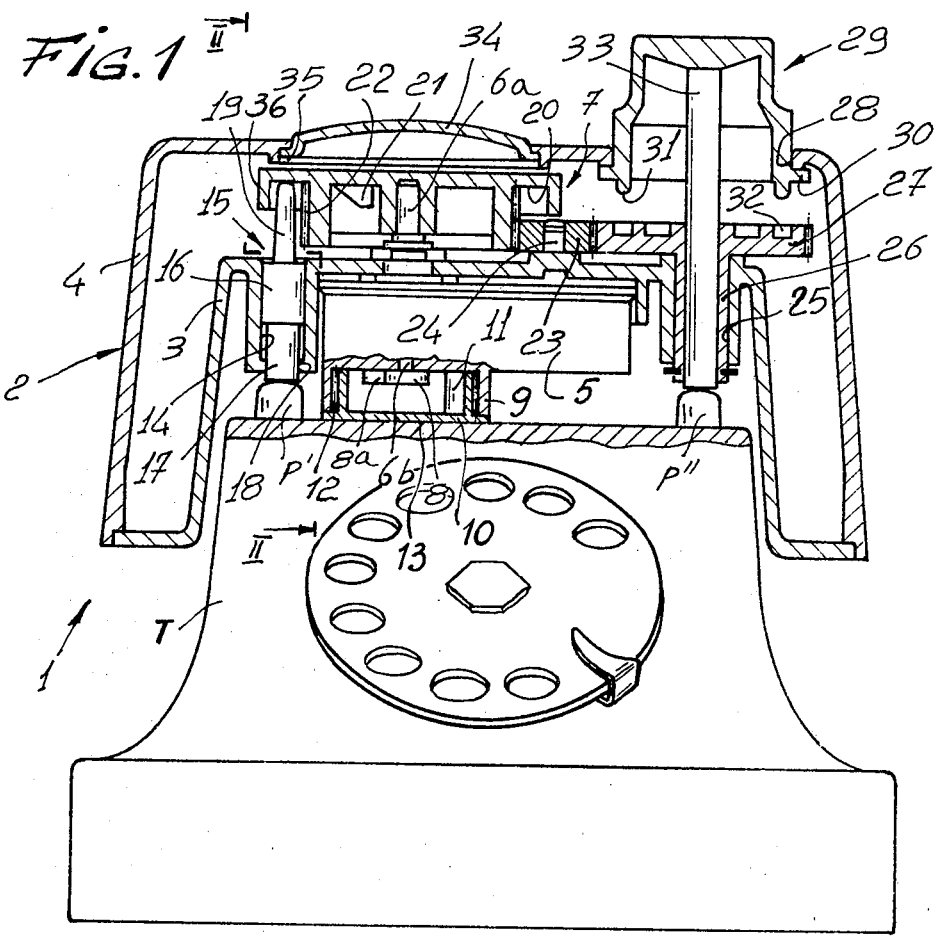
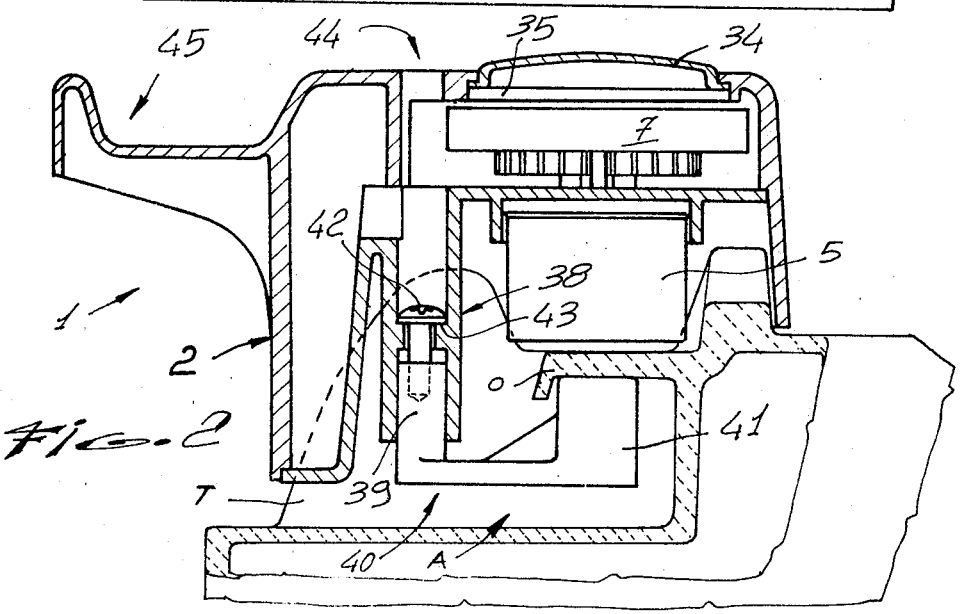

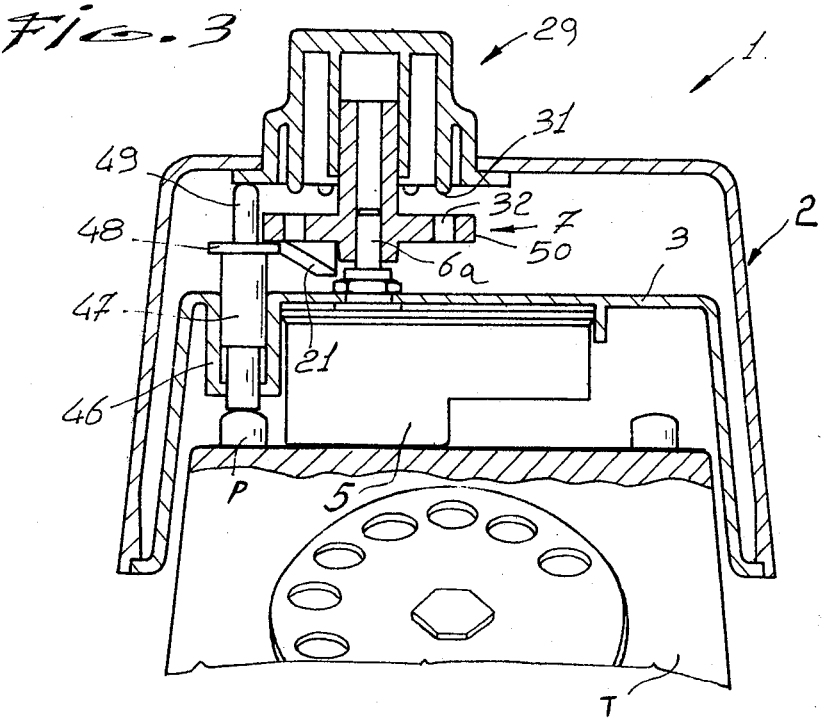
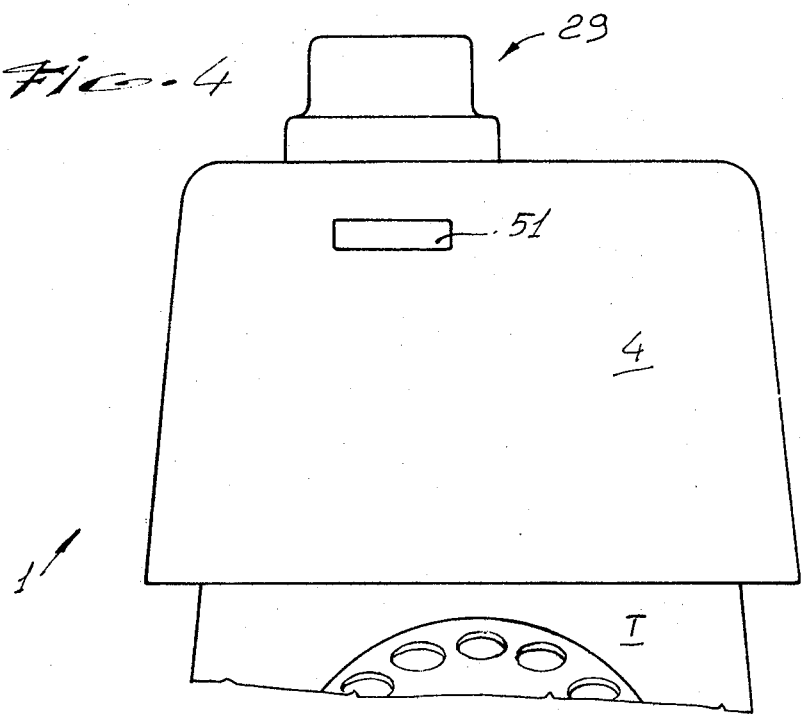

MECHANICAL TELEPHONE CONVERSATION TIME LIMITING DEVICE

BACKGROUND OF THE INVENTION

This invention relates to a mechanical telephone conversation time limiting device.

It is known that the costs for telephone utilities reach considerably high figures, both in the business and domestic fields; also known is that such costs, while presently as far as intercity calls are concerned but most probably infracity calls as well within the next future, are proportional to the duration of the conversations. Moreover, it will be recognized that the duration of telephone conversations is very often unduly prolonged beyond strictly necessary limits: it can be observed, in fact, for instance on the occasion of business telephone calls, that little importance is given to the incidence of telephone calls, whilst more time is frequently wasted on preliminaries, digressions and superfluous formalities than is spent to communicate information of substantial value. This reflects in practice in out-of-proportion telephone expenses as well as useless and costly distraction of employees from their job.

Those devices, currently available on the market, which disable a telephone set when a call is effected (i.e. which only allow calls to be received), fail to solve the second of the above problems (time substracted to the corporation) and cannot be always utilized because it is often required that employees make telephone calls.

On the other hand, known are devices for automatically interrupting a telephone conversation which are so constructed as to be applicable to a standard telephone set. These devices, which are known in particular from U.S. Pat. Nos. 2,202,149, 2,609,045 and 3,472,966, comprise a case or housing intended for attachment to the telephone set and containing a mechanical timer which is started upon the handset being raised to make a call. The timer, upon expiration of the time interval to which it has been set or designed, acts on one or more movable members effective to interrupt the conversation by acting on one shut-off pushbutton of the telephone set to depress it.

The casing can be secured to the telephone set by means of a key-operated padlock, and may be configured to prevent access to the shut-off pushbuttons of the set when the casing is attached to the set, as described in the above mentioned U.S. Pat. No. 3,472,966. In all cases, in spite of such features, these devices have the drawback that they can be easily thwarted, in that they allow, during the telephone conversation, the timer to be reset indefinitely, thereby one is enabled to avoid the interruption of the conversation and can carry it on at will. Another drawback of these devices is that they have a complex construction and not always operate exactly at the preset time.

Also known are devices which are operative to interrupt a telephone conversation after a preset time lapse, which rather then utilizing mechanical members, make use of electronic elements and circuits. A device of this type is disclosed in French Pat. No. 2,272,551. This device operates on the telephone line itself as actuated by a signal emitted on that line. However, it requires therefore manipulation of the telephone line, and is difficult to install and use without undergoing penalties or meeting the opposition of telephone companies.

SUMMARY OF THE INVENTION

This invention sets out to provide a mechanical telephone conversation time limiting device, which can be easily installed on an ordinary telephone set without involving alteration or modification of the telephone line and cannot be thwarted, thus ensuring positive interruption of the conversation at the expiration of a maximum preset time limit.

Within that general aim, it is further desired to provide a device of the above-mentioned type which while being construction-wise simple and economical, can be installed by the user directly, thereby it can find widespread applicability, and is moreover such as to allow the duration of a telephone conversation on a given set to be changed beforehand, although only by an authorized operator.

According to the present invention there is provided a mechanical telephone conversation time limiting device, comprising a casing attachable to a telephone set by means of a combination means, such as a key-operated lock, a timer within said casing, means for setting said timer, and means operatively connected to said timer for interrupting the telephone communication at the end of a preset time period, said operatively connected means being engageable with one of the telephone communication shut-off pushbuttons provided on the telephone set and said casing being configured such as to prevent access to said shut-off pushbuttons when attached to said telephone set, said device being characterized in that said setting means for said timer can only be activated in the depressed position of at least one of said shut-off pushbuttons.

A device of this type is of the utmost effectiveness against unauthorized or prolonged telephone calls, in that it not only is undetachable from the telephone set, excepting by the holder of the key which unlocks the device, but also, and above all, because any attempt to reset the timer or stop its movement in order to increase the duration of the telephone conversation involves of necessity a depression of one of the shut-off pushbuttons and accordingly, a definitive interruption of the communication.

BRIEF DESCRIPTION OF THE DRAWINGS

Further features of the invention will be more clearly understood from a detailed description of two preferred, though not limitative, embodiments of a device according to the invention, as illustrated by way of example only in the accompanying drawings, where:

FIG. 1 is a schematical front view of a telephone set incorporating a telephone conversation time limiting device according to the invention, shown sectioned along a vertical plane;

FIG. 2 is a sectional view of the device of FIG. 1, taken along the line II—II of FIG. 1;

FIG. 3 shows a variation of the device illustrated in the preceding figures, as shown in a section along a vertical plane; and FIG. 4 is a schematical front view of the device of FIG. 3.

DESCRIPTION OF THE PREFERRED EMBODIMENTS

With reference to the drawing figures, a device according to this invention is indicated generally at 1: in the exemplary embodiment shown, the device 1 is attached to a telephone set, indicated at T, of a type currently more widely employed: that set, which is only shown schematically, has at the cradle or supporting saddle for the handset (not shown) a horizontal wall O, and on the rear a large opening or cutout A for lifting the set up; on both sides of the hook there protrude from the telephone set casing in a manner known per se two pushbuttons P' and P" actuating the set switch: the pushbuttons define conventional shut-off and enabling switches for the phone conversation and move spontaneously from a lowered position, whereat they are held by the handset weight and no telephone connection can be established, to a raised position whereat connection becomes possible.

The device 1 comprises a casing or housing 2 which can be attached to the telephone set T in a manner to be described hereinafter and is made in two parts, an inner one 3 and an outer one 4, which are rigidly and permanently secured to each other upon assembling the device during the manufacturing step thereof; the casing 2 is shaped to rest at the cradle of the telephone set T and has side walls depending over the set T such as to enclose the top thereof and make the pushbuttons P' and P" inaccessible, once the casing 2 has been attached to the telephone set T. It will be appreciated that for telephone sets other than the one shown, the dimensions of the casing will differ, while still meeting the requirements just mentioned hereinabove.

On the lower face of the part 3 of the casing 2, there is secured a mechanical timer 5, e.g. of the type commonly employed in kitchen ranges or cookers. Advantageously, the timer 5 has a flattened elongated parallelepipedal shape and has an actuating shaft set vertically therethrough with its top end 6a and lower end 6b protruding from the timer. To the top end 6a of the shaft, there is keyed a movable member 7 of substantially disk-like or cup-like shape which can be rotated from a stable and fixed reference position to an angularly shifted position with respect to said fixed position: from the latter position, when the timer 5 is being operated, the movable member 7 spontaneously tends to slowly return to its reference position within a time which is proportional to the angle by which it has been rotated.

To the bottom or lower end 6b of the shaft, there is keyed a bushing 8 having a projecting radial lug 8a; at the lower protruding region of the shaft; there is secured to the timer 5 a small flattened cylindrical box 9, downwardly open, wherein a small lid 10 can be pressed; the lid 10 is provided internally, in the path of movement of the lug 8a, with an ear or radial detent 11 adapted for acting as a travel limit stop for the rotation of the shaft 6a,6b, more specifically of the lug 8a; suitably, the cylindrical surfaces in mutual contact of the box 9 and lid 10 are provided all around them with respective pluralities of minute longitudinal teeth or serrations 12, adapted to permit the lid 10 to be inserted into the box 9 according to a plurality of different relative angles, and adapted to prevent the lid from being rotated with respect to the box after it has been inserted therein.

On the lower or bottom face 13 of the lid 10, there is engraved a progressive numerical scale which is proportional to the return time of the timer 5, while on the outside of the box 9 a reference mark is provided. Thus, it will be easy to position the lid 10 such that the ear 11 is angularly offset with respect to the rest and referenced position from the radial lug 8a—which corresponds to the rest or inoperative position of the timer 5—by an angle equal to the angle spanned by the lug in the programmed time at the end whereof the telephone connection is to be interrupted. After setting the time limit and mounting the device 1 on the telephone set T in a manner to be explained hereinafter, the lid 10 and box 9 remain inaccessible.

At that region of the part 3 of the casing 2 which is located at the shut-off pushbutton P' when the device 1 is installed on the telephone set T, there is formed a vertical cylindrical socket or seat 14 for slidingly receiving a stem 15 therein which is part of means which are operatively connected to the timer 5 to interrupt the telephone connection or conversation at the end of a determined time lapse. The stem 15 has a central portion 16 which is followed by a lower portion 17 of reduced diameter which is set to protrude from the base of the socket 14, also formed with a diameter reduction 18 effective to prevent the stem 15 from sliding downwards fully out of the socket 14.

When the casing 2 is attached to the set T and the pushbutton P' is raised, the stem 15 is lifted by the pushbutton P' and its top or upper portion 19, of reduced diameter, touches the lower face 20 of the movable member 7. From the lower face 20 of the member 7, there projects downwards a tooth 21, preferably of sawtooth-like configuration, which, when the movable member 7 is in its stable reference position—the timer 5 being in its end-of-travel rest position—and when the casing 2 is attached to the telephone set T, is located on the vertical of the stem 15 and urges it downwards: the stem 15, in turn, will urge downwards, with its lower end portion 17, the pushbutton P' to its condition of interruption of the telephone connection.

The movable member 7 carries at the bottom a drum 22 which is provided all around it with an outer serration or tooth formation wherewith a pinion gear 23 is mesh engaged which is idly mounted on a pivot pin 24 which protrudes upwards from the top or upper face of the timer 5 or is rigid with the part 3 of the casing 2. In this part 3 of the casing 2, at a region located on the vertical of the shut-off pushbutton P", when the casing 2 is attached to the set T, there is formed a vertical cylindrical socket or seat 25 for accommodating rotatably therein a tubular pivot 26 of a rotatable element in the form of a gear wheel 27 in mesh engagement with the pinion gear 23. The pivot 26 and gear wheel 27 are retained against axial movement in the socket 25. On the vertical of the socket 25, at the part 4 of the casing 2, there is provided a large circular opening or cutout 28 wherethrough an actuating knob 29 protrudes upwardly coaxial with the gear wheel 27: the knob 29 has at the bottom and externally to it a ridge 30 which prevents it from being withdrawn upwardly through the opening 28. Under the lower face of the knob 29, there are distributed a plurality of small pins 31 adapted for insertion, upon depressing the knob 29, into holes 32 correspondingly distributed over the upper face of the gear wheel 27.

The knob 29 carries a pin 33, axially rigid therewith, which passes vertically through the tubular pivot 26 and is rotatable and axially movable therein, said pin 33 abutting with its lower end against the pushbutton P". The length of the pin 33 is selected such that, when the device 1 is mounted on the set T and the pushbutton P" is in its raised position, the pins 31 are disengaged from their related holes 32 in the gear wheel 27; in practice, to produce the rotation of the gear wheel 27, and accordingly, through the pinion gear 23, of the movable member 7, i.e. to set the timer 5 for operation, the knob 29 must be pushed downwards and rotated. Since in that condition the button P" is depressed, it will be appreciated that any attempt by the user at retarding the return of the timer 5 to the reference position, or resetting the timer by manipulating the knob 29, unavoidably results in the telephone connection being interrupted.

In order to allow the user to realize that time glides away and the end of the connection is approaching, on the upper face of the movable member 7 there is provided a graduated or color-coded scale which can be observed through a transparent wall 34 secured at a window 35 formed through the part 4 of the casing 2 above the member 7; for the same purpose, a graduated or color-coded scale with angular zones of different colors may be provided on the lateral surface 36 of the member 7 by cutting out a small window, covered by a transparent wall, on the front face of the part 4 of the casing 2. Thus, it becomes possible to keep track of the approaching end of the conversation both from above and from the front. Naturally, it will also be possible to provide an acoustical warning signal, e.g. by associating the timer 5 with a buzzer arranged to operate thirty seconds before the programmed communication time expires. To securely attach the device 1 to the telephone set T, it is contemplated that a guide 38 is formed at the rear of the part 3 of the casing 2 for receiving slidably therein a shank 39 of a clamp 40; the clamp 40 has a cantilevered lug or appendage 41 which is adapted for clamp engaging, in cooperation with the box 9 and lid 10, the wall O of the telephone set T. That clamping engagement is accomplished by threading a clamp screw 42 into the shank 39, the head of the screw 42 abutting against a reduced diameter portion 43 on the guide 38. Above the guide 38, there is formed through the part 4 a seat or socket 44 for accommodating a lock equipped with a removable key. With the lock in place, the socket 44 remains closed, thereby it is impossible to gain access to the screw 42 in order to remove the device 1 or juggle the setting of the conversation time. The lock may be of the cylindrical type with rotatable bit, in which case the bit will engage an opening in the casing 2, communicating with the socket 44.

In the rest or inoperative condition, the telephone handset is allowed to rest on a hook or cradle 45 formed at the rear of the casing 2. However, it is possible for said hook or cradle to be formed at a location such that on putting down the handset, the latter is caused to rest onto the knob 29, thus shutting off the communication.

The device described in the foregoing operates in the following manner.

In the rest or inoperative condition, the device 1 is at a position where the tooth 21 engages the upper portion 19 of the stem 15 and the latter keeps the button P' depressed, the timer 5 being in its inoperative position (this position may be stabilized by means of an end-of-travel device, not shown). Upon calling, whether an oncoming or outgoing one, in addition to the usual step of picking up the handset and dialling the number if the call is an outgoing one, the user will have to depress the knob 29 and turn it in the appropriate direction to set the timer 5. This operation releases the tooth 21 from the stem 15, thus immediately activating the telephone connection with the called or calling party. It should be noted that the rotation of the knob 29 is stopped upon the lug 8a striking the detent 11, which had been previously positioned at a position corresponding to the desired duration of the telephone conversation.

From that time on, the timer 5 will move the movable member 7 in the opposite direction to the setting one until, at the end of the set time period, the tooth 21 progressively lowers, with its front inclined surface, the stem 15, and consequently the button P', to interrupt the connection at the end of the preset time. Through the window 34, the user will be able to monitor the passing of time and estimate the time available before the conversation is interrupted, so that the conversation can be centered on essential matter, without any waste of time.

It should be further noted that if the conversation comes to an end early with respect to the duration set on the timer, it will still be possible to interrupt the telephone connection manually by pushing downwards on the knob 29 and setting the timer back to zero, thereby preventing the connection from remaining purposelessly open and the payment for unused telephone time.

FIGS. 3 and 4 show a second embodiment of a device according to this invention, which from a merely functional standpoint is quite similar to the device of FIGS. 1 and 2. Similar components have been designated with the same reference numerals and letters. The device of FIGS. 3,4 differs from the one of FIGS. 1,2 in that it acts on but one of the pushbuttons P of the telephone set T. Thus, one guide 46 only will be provided, which is arranged at a position such that when the casing 2 is attached to the set T, it is located on the vertical of one pushbutton P, to allow a stem 47 to slide vertically. The stem 47 is formed at the top with an annular embossment 48 against which is active the tooth 21 of the movable member 7; the remaining portion of the stem 47 is configured like the stem 15 of FIGS. 1 and 2. The knob 29 is arranged on the vertical of the movable member 7 and its pins 31 can be inserted in corresponding holes 32 provided in the top or upper face of the movable member 7; the lower peripheral edge of the knob 29 is caused to rest onto the top 49 of the stem 47 such that when the knob is depressed to engage the movable member 7 for rotation, the stem 47, with the device installed, urges the button P downwards to interrupt the communication. In this embodiment, the reference scale or graduations related to the duration of the telephone conversation is attached to the edge 50 of the movable member 7 and is visible through a small window 51 in the part 4 of the casing of the device 1.

The operation of the device shown in FIGS. 3 and 4 is similar to that of the device of FIGS. 1 and 2.

It will be apparent from the foregoing description that this invention provides a simple device which can be applied without requiring any special skill and cannot be juggled in any way.

The invention as described is susceptible to many modifications and variations thereof, all of which fall within the purview of the instant inventive concept. Thus, for example, it would be possible to connect the cradle for the handset to the knob 29 in such a manner as to depress the knob 29 upon re-hooking the handset at the end of a telephone conversation. Thus, it would be no longer necessary to reset the timer to zero at the end of a shorter conversation than the set duration.

We claim:

1. A mechanical telephone conversation time limiting device comprising a casing, combination means for attaching said casing to a telephone set so as to prevent access to the telephone shut-off push buttons arranged thereon, a timer arranged within said casing and having a movable member, means for setting said timer, means operatively connected to said movable member for interrupting the telephone communication at the end of a predetermined time period of operation by engaging with one of said push buttons wherein according to the improvement a manually operated knob is provided extending outwardly from said casing through an opening thereof and rotatably and axially movable from a raised to a depressed condition, first transmission means between said knob and said timer setting means and operable in the depressed condition of said knob, second transmission means between said knob and one of said shut-off push buttons and operable in the depressed condition of said knob, so as to cause said timer setting means to get in transmissive engagement with said knob and to set thereby said timer setting means according to said predetermined time period of operation and to simultaneously depress one of said shut-off push buttons, when said knob is in its depressed condition and to set free said timer setting means and said shut-off push button when said knob is in its raised condition.

2. A device according to claim 1 wherein said operatively connected means comprise a movable stem protruding from said casing and arranged in said casing in alignment and in contact with one of said shut-off push buttons, and said movable member comprises a rotating disc having an axial projection arranged at a position such as to engage said stem to hold said one of said push buttons in depressed condition upon said timer reaching its rest position at the end of the predetermined operation time.

3. A device according to claim 1 wherein said knob is arranged above said movable member and has a peripheral edge located inside said casing and above a stem in contact therewith.

4. A device according to claim 1 wherein said timer setting means comprise at least one rotatable element operatively connected to said movable member and wherein said knob is coaxially arranged above said rotatable element and comprises a pin which passes coaxially through said rotatable element and is rotatable therein, said pin and said rotatable element being arranged in said casing at a position such that when the casing is attached to the telephone set said pin is aligned to and contacts one of said shut-off push buttons, axial downward displacement of said knob causing rotating engagement of said knob with said rotatable element and simultaneous depression of said push buttons.

5. A device according to claim 1, wherein with said movable member, there is coaxially rigid a bushing provided with a radial lug, and that a detent is provided adjustable at different angular positions in the path of said radial lug to change the operation time of said timer, said detent being inaccessible when said casing is attached to said telephone set.

6. A device according to claim 5, wherein said detent is defined on an inner side wall of a cylindrical portion of a small lid, said small lid being mountable on a small box rigid with said timer and inaccessible when said casing is attached to said telephone set.

7. A device according to claim 1, wherein said casing is attachable to said telephone set by means of a clamp arranged to be tightened through a screw received in a socket of said casing, said screw being precluded by means of a lock operated with a removable key and arranged in said socket.

* * * * *